United States Patent
Ohkawa et al.

(10) Patent No.: US 9,590,431 B2
(45) Date of Patent: Mar. 7, 2017

(54) BATTERY CONTROLLER, BATTERY SYSTEM

(75) Inventors: Keiichiro Ohkawa, Hitachinaka (JP); Kenji Nakai, Hitachinaka (JP); Hiroshi Morikawa, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 441 days.

(21) Appl. No.: 14/366,892

(22) PCT Filed: Dec. 22, 2011

(86) PCT No.: PCT/JP2011/079834
§ 371 (c)(1),
(2), (4) Date: Jun. 19, 2014

(87) PCT Pub. No.: WO2013/094057
PCT Pub. Date: Jun. 27, 2013

(65) Prior Publication Data
US 2014/0339891 A1 Nov. 20, 2014

(51) Int. Cl.
*H02J 7/00* (2006.01)
*H01M 10/44* (2006.01)
(Continued)

(52) U.S. Cl.
CPC ............ *H02J 7/0021* (2013.01); *B60L 3/003* (2013.01); *B60L 3/0046* (2013.01); *B60L 3/0061* (2013.01); *B60L 3/06* (2013.01); *B60L 11/1803* (2013.01); *B60L 11/1857* (2013.01); *B60L 11/1861* (2013.01); *B60L 11/1864* (2013.01); *H01M 10/44* (2013.01); *H01M 10/48* (2013.01); *H02J 7/0014* (2013.01); *H02J 7/04* (2013.01); *H02J 7/045* (2013.01); *H02J 7/047* (2013.01);
(Continued)

(58) Field of Classification Search
CPC ......... H01M 10/44; H01M 2010/4271; H01M 2220/20; Y02T 10/7061; B60L 3/003; B60L 11/1857; H02J 7/04
USPC .......................................... 307/9.1
See application file for complete search history.

(56) References Cited

U.S. PATENT DOCUMENTS 7,714,543 B2 * 5/2010 Yoshida ................ B60L 3/0038
320/134
2009/0321163 A1 12/2009 Suzui
(Continued)

FOREIGN PATENT DOCUMENTS

JP 2007-288906 A 11/2007
JP 2009-207312 A 9/2009
(Continued)

Primary Examiner — Jared Fureman
Assistant Examiner — Duc M Pham
(74) Attorney, Agent, or Firm — Volpe and Koenig, P.C.

(57) ABSTRACT

A battery controller that performs current limitation in consideration of limitation on other components than a battery main body and the state of health of a battery is provided. A battery controller limits a battery current using allowable average current information describing current average values respectively allowed for a plurality of time windows. When the battery is deteriorated, an allowable average current obtained by subtraction in response to the state of health is used. Further, when the battery current exceeds an upper limit value stored in advance, the battery current is controlled with the upper limit reduced by the excessive amount.

16 Claims, 9 Drawing Sheets

(51) Int. Cl.
*B60L 3/00* (2006.01)
*B60L 3/06* (2006.01)
*B60L 11/18* (2006.01)
*H02J 7/04* (2006.01)
*H01M 10/48* (2006.01)
*H01M 10/42* (2006.01)

(52) U.S. Cl.
CPC ... *B60L 2240/545* (2013.01); *B60L 2240/547* (2013.01); *B60L 2240/549* (2013.01); *B60L 2240/80* (2013.01); *H01M 2010/4271* (2013.01); *H01M 2220/20* (2013.01); *H02J 7/007* (2013.01); *H02J 2007/005* (2013.01); *Y02T 10/7005* (2013.01); *Y02T 10/7044* (2013.01); *Y02T 10/7061* (2013.01)

(56) References Cited

U.S. PATENT DOCUMENTS

| | | | |
|---|---|---|---|
| 2011/0313613 A1* | 12/2011 | Kawahara | H01M 10/441 701/34.4 |
| 2012/0175953 A1* | 7/2012 | Ohkawa | B60L 3/0046 307/18 |
| 2014/0184166 A1* | 7/2014 | Ohkawa | H01M 10/441 320/134 |

FOREIGN PATENT DOCUMENTS

| | | |
|---|---|---|
| JP | 2010-256323 A | 11/2010 |
| WO | 2012/169062 A1 | 12/2012 |

\* cited by examiner

BATTERY CONTROLLER, BATTERY SYSTEM

TECHNICAL FIELD

This invention relates to a technology of controlling a battery.

BACKGROUND ART

On vehicles traveling using electricity as motive power, storage batteries including lead batteries, nickel-hydride batteries, and lithium-ion batteries are mounted. The electric power necessary when hybrid cars and electric cars travel is provided by these storage batteries.

The following PTL 1 has disclosed, as a method of properly setting an input limit and an output limit of a battery, a technology of setting a limit value by comparing a time-average value of square values of charge and discharge currents with a threshold value.

The following PTL 2 has disclosed that an allowable current allowing charge and discharge of a battery is specified by an average current of absolute values of charge and discharge currents. Further, the PTL 2 has disclosed that the allowable current is made smaller as a time for detection of the average current is longer.

CITATION LIST

Patent Literatures

PTL 1: JP-A-2007-288906
PTL 2: JP-A-2009-207312

SUMMARY OF INVENTION

Technical Problems

According to the technology disclosed in the PTL 1, the proper input and output limits of the battery are intended, however, in practice, there are other components forming the battery than the battery main body and current limit values may vary in the respective components. For using the battery more optimally, it is desirable to set the current limit value with respect to each of the components forming the battery and use the battery within the range.

Further, the above described current limit value varies in response to the state of health of the battery. For example, when the deterioration of the battery progresses, charge and discharge performance becomes lower compared to that before deterioration, and it is necessary to set the current limit value to the smaller value than that before deterioration. It is also considered that the current limit value is set in anticipation of the battery deterioration in advance, however, the setting is undesirable because the lower current limit value than the intrinsic charge and discharge performance is employed at the time before deterioration of the battery.

According to the technology disclosed in the PTL 2, for example, even when the battery current exceeds the upper limit determined by the battery controller due to the load failure, the battery current is controlled according to the average current and the detection time, and it is difficult to cope with the abnormality.

The invention has been achieved to solve the above described problems, and an object thereof is to provide a battery controller that may reliably perform current limitation by taking into consideration limits relating to other components than a battery main body and the state of health of the battery.

Solution to Problems

A battery controller according to the invention limits a battery current using allowable average current information describing current average values respectively allowed by a plurality of time window widths for the respective time window widths. When a battery is deteriorated, an allowable average current obtained by subtraction in response to a degree of the deterioration is used. Further, when the battery current exceeds an upper limit value stored in advance, the battery current is controlled with the upper limit value reduced by the excessive amount.

Advantageous Effects of Invention

According to the battery controller of the invention, the battery current may be controlled in consideration of current limits for the respective components connected to the battery and the state of health of the battery.

DESCRIPTION OF EMBODIMENTS

As below, embodiments of the invention will be explained with reference to the drawings. In the following embodiments, a case where the invention is applied to a battery system forming a power source of a plug-in hybrid car (PHEV) will be explained as an example.

Further, in the following embodiments, a case where a lithium-ion battery is employed will be explained as an example, however, a nickel-hydride battery, a lead battery, an electric double layer capacitor, a hybrid capacitor, or the like may also be used. Note that, in the following embodiments, an assembly battery is formed by series connection of battery cells, however, an assembly battery may be formed by series connection of parallel-connected battery cells, or an assembly battery may be formed by parallel connection of series-connected battery cells.

<Embodiment 1: System Configuration>

Figure 1:
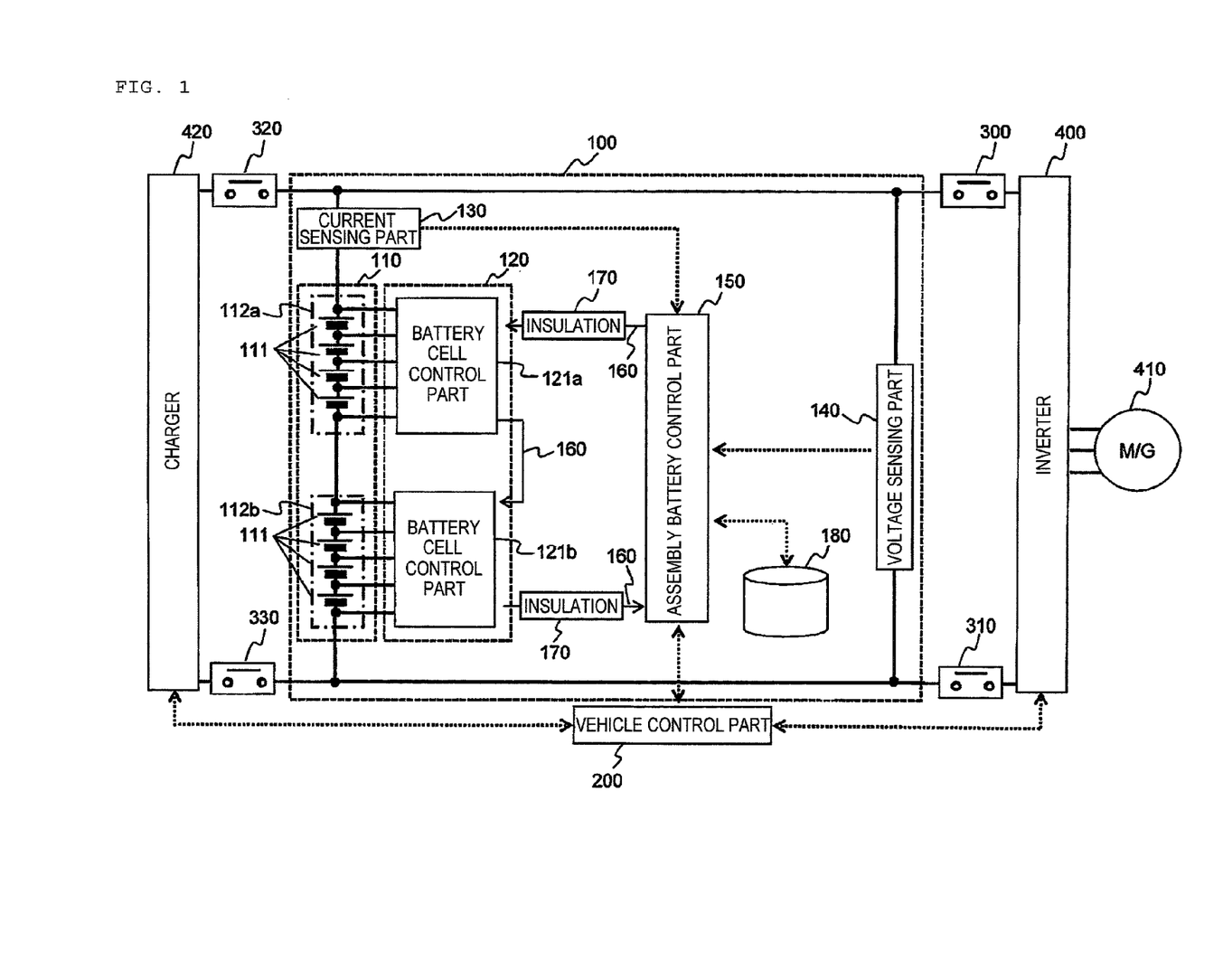
FIG. 1 shows a configuration of a battery system 100 and around the system according to embodiment 1.

FIG. 1 shows a configuration of a battery system 100 and around the system according to embodiment 1 of the invention. The battery system 100 is connected to an inverter 400 via relays 300 and 310, and connected to a charger 420 via relays 320 and 330. The battery system 100 includes an assembly battery 110, a battery cell management part 120, a current sensing part 130, a voltage sensing part 140, an assembly battery control part 150, and a memory part 180.

The assembly battery 110 includes a plurality of battery cells 111. The battery cell management part 120 monitors states of the battery cells 111. The current sensing part 130 senses a current flowing in the battery system 100. The voltage sensing part 140 senses a total voltage of the assembly battery 110. The assembly battery control part 150 controls the assembly battery 110.

The assembly battery control part 150 receives battery voltages and temperatures of the battery cells 111 transmitted by the battery cell management part 120, a current value flowing in the battery system 100 transmitted by the current sensing part 130, and a total voltage value of the assembly battery 110 transmitted by the voltage sensing part 140. The assembly battery control part 150 senses a state of the assembly battery 110 based on the received information. The result of the state sensing by the assembly battery control part 150 is transmitted to the battery cell management part 120 and a vehicle control part 200.

The assembly battery 110 is formed by electrical series connection of the plurality of battery cells 111 that can accumulate and release electrical energy (charge and discharge direct-current electric power). The battery cells ill forming the assembly battery 110 are grouped in a predetermined number of units in execution of management and control of the states. The grouped battery cells 111 are electrically series-connected to form battery cell groups 112a, 112b. The numbers of battery cells 111 forming the battery cell group 112 may be the same in all battery cell groups 112 or the number of battery cells 111 may be different with respect to each battery cell group 112.

The battery cell management part 120 monitors the states of the battery cells 111 forming the assembly battery 110. The battery cell management part 120 includes battery cell control parts 121 provided for the respective battery cell group 112. In FIG. 1, the battery cell control parts 121a and 121b are provided in correspondence with the battery cell groups 112a, 112b. The battery cell control part 121 monitors and controls the states of the battery cells 111 forming the battery cell group 112.

In the embodiment 1, for simplicity of explanation, four of the battery cells 111 are electrically series-connected to form the battery cell groups 112a, 112b, and the battery cell groups 112a, 112b are further electrically series-connected to form the assembly battery 110 including the eight battery cells 111 in total.

The assembly battery control part 150 and the battery cell management, part 120 transmit and receive signals via insulation elements 170 represented by photo-couplers and signal communication means 160.

Communication means between the assembly battery control part 150 and the battery cell control parts 121a and 121b forming the battery cell management part 120 will be explained. The battery cell control parts 121a and 121b are series-connected according to the descending order of the potentials of the battery cell groups 112a, 112b monitored by the battery cell control parts 121a and 121b, respectively. The signal transmitted to the battery cell management part 120 by the assembly battery control part 150 is input to the battery cell control part 121a via the insulation element 170 and the signal communication means 160. The output of the battery cell control part 121a is input to the battery cell control part 121b via the signal communication means 160, and the output of the lowermost battery bell control part 121b is transmitted to the assembly battery, control part 150 via the insulation element 170 and the signal communication means 160. In the embodiment 1, the insulation element 170 does not intervene between the battery cell control part 121a and the battery cell control part 121b, however, the signals may be transmitted and received via the insulation element 170.

The memory part 180 stores information including inner resistance characteristics, capacities when fully charged, polarization voltages, deterioration characteristics, individual difference information of the assembly battery 110, the battery cells 111, and the battery cell group 112, and a correspondence relationship between the SOC and an open circuit voltage (OCV). Further, the part may store characteristic information of the battery cell management part 120, the battery cell control parts 121, the assembly battery control part 150, etc. in advance. The information stored by the memory part 180 will be explained again with FIGS. 4, 6, and 7 to be described later.

The assembly battery control part 150 executes calculation for controlling the SOC, the state of health (SOH), chargeable and dischargeable currents and electric power (hereinafter, the charge side is a positive value and the discharge side is a negative value), the abnormality states, and amounts of charge and discharge of one or more battery cells 111 using the information received from the battery cell management part 120, the current sensing part 130, the voltage sensing part 140, and the vehicle control part 200 and an SOC table 181 and an internal resistance table 182, which will be described later. Then, the part outputs information to the battery cell management part 120 and the vehicle control part 200 based on the calculation results.

The vehicle control part 200 controls the inverter 400 connected to the battery system 100 via the relays 300 and 310 using the information transmitted by the assembly battery control part 150. Further, the part controls the charger 420 connected to the battery system 100 via the relays 320 and 330. During traveling of the vehicle, the battery system 100 is connected to the inverter 400, and drives a motor generator 410 using the energy accumulated by the assembly battery 110. At the time of charging, the battery system 100 is connected to the charger 420, and charged by electric power supply from a household power source or an electric station.

The charger 420 is used when the assembly battery 110 is charged using an external power source represented by the household or electric station. In the embodiment 1, the charger 420 is adapted to control the charge voltage, the charge current, and the like based on a command from the vehicle control part 200, however, may perform control based on, a command from the assembly battery control part 150. Further, the charger 420 may be provided within the vehicle or outside of the vehicle in response to the configuration of the vehicle, the performance of the charger 420, the purpose of use, the installation condition of the external power source, or the like.

When a vehicle system equipped with the battery system 100 starts and travels, under the management of the vehicle control part 200, the battery system 100 is connected to the inverter 400 and drives the motor generator 410 using the energy accumulated by the assembly battery 110, and the assembly battery 110 is charged by the electric power generated by the motor generator 410 at the time of regeneration. When the vehicle including the battery system 100 is connected to the external power source represented by the household or electric station, the battery system 100 and the charger 420 are connected based on the information transmitted by the vehicle control part 200, and the assembly battery 110 is charged to be in a predetermined condition. The energy accumulated in the assembly battery 110 by charging is utilized at the next traveling of the vehicle and also utilized for activation of electric components inside and outside of the vehicle, etc. Further, according to need, the energy may be released to the external power source represented by the household power source.

Figure 2:
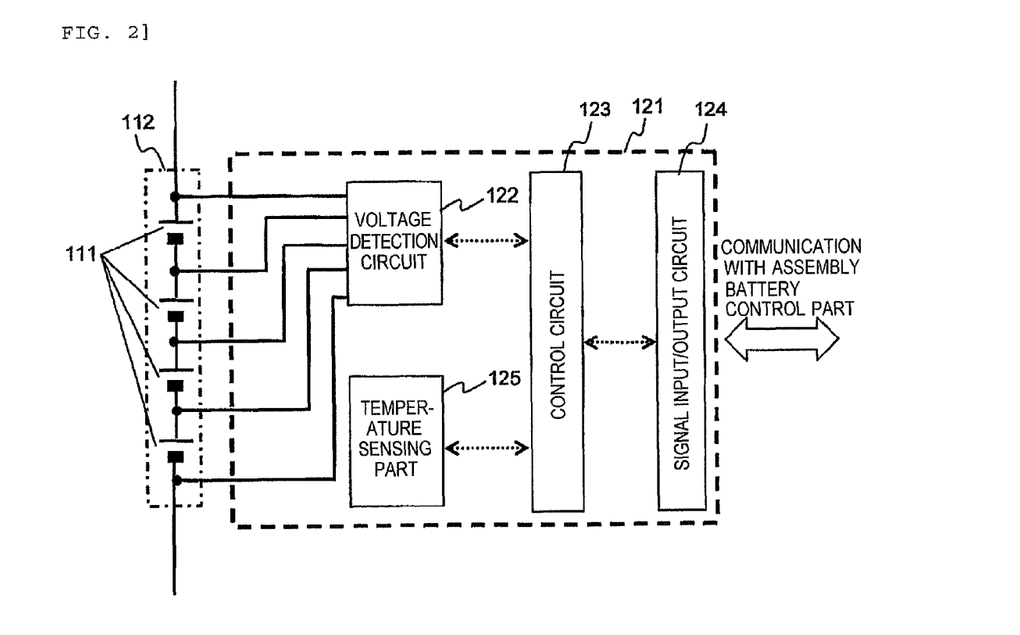
FIG. 2 shows a circuit configuration of a battery cell control part 121.

FIG. 2 shows a circuit configuration of the battery cell control part 121. The battery cell control part 121 includes a voltage detection circuit 122, a control circuit 123, a signal input/output circuit 124, and a temperature sensing part 125. The voltage detection circuit 122 measures voltages between terminals of the respective battery cells 111. The control circuit 123 receives measurement results from the voltage detection circuit 122 and the temperature sensing part 125, and transmits the results to the assembly battery control part 150 via the signal input/output circuit 124. Note that the circuit configuration for uniformizing the voltages between the battery cells 111 and SOC variations generated due to self-discharge, variations in current consumption, etc. which is generally mounted on the battery cell control part 121, is known and the description thereof is omitted.

The temperature sensing part 125 of the battery cell control part 121 in FIG. 2 has a function of measuring the temperature of the battery cell group 112. The temperature sensing part 125 measures one temperature as the whole battery cell group 112, and handles the temperature as a temperature representative value of the battery cells 111 forming the battery cell group 112. The temperature measured by the temperature sensing part 125 is used for various kinds of calculations for sensing the states of the battery cells 111, the battery cell group 112, or the assembly battery 110. FIG. 2 is based on the assumption, and one temperature sensing part 125 is provided in the battery cell control part 121. The temperature sensing part 125 may be provided with respect to each battery cell 111, the temperature may be measured with respect to each battery cell 111, and various kinds of calculations may be executed based on the temperature with respect to each battery cell 111, however, in this case, the configuration of the battery cell control part 121 becomes complex by the larger number of temperature sensing parts 125.

FIG. 2 simply shows the temperature sensing part 125. In practice, a temperature sensor is provided on an object for temperature measurement, and the provided temperature sensor outputs temperature information as a voltage, a result of measurement of the voltage is transmitted to the signal input/output circuit 124 via the control circuit 123, and the signal input/output circuit 124 outputs the measurement result to the outside of the battery cell control part 121. The function of realizing the series of flow is mounted as the temperature sensing part 125 on the battery cell control part 121, and the voltage detection circuit 122 may be used for the measurement of the temperature information (voltage).

Figure 3:
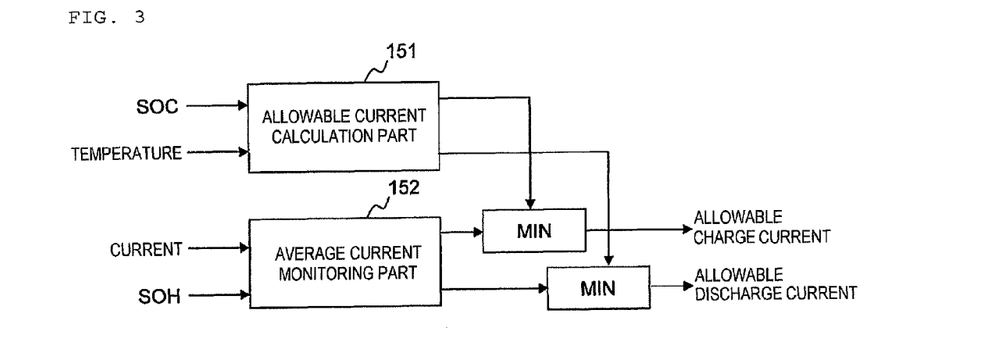
FIG. 3 shows processing contents performed by an assembly battery control part 150 in control blocks.

FIG. 3 shows control blocks showing an allowable current calculation part 151 and an average current monitoring part 152 for realization of charge and discharge control of the assembly battery 110 by the assembly battery control part 150. The SOC and the temperature are input to the allowable current calculation part 151, and the current values output from and input to the assembly battery 110 are used as input for the average current monitoring part 152. The output of the allowable current calculation part 151 and the output of the average current monitoring part 152 are compared and the smaller value is output to the outside.

Further, a value of state of health (SOH) of the assembly battery 110 is input to the average current monitoring part 152. As a method of obtaining the state of health of the assembly battery 110, any known technology may be used. For example, methods of (a) obtaining the state of health of the assembly battery 110 using rise of the internal resistance of the battery cell 111 when the battery cell 111 is deteriorated, (b) obtaining the state of health of the assembly battery 110 by sensing decrease in the maximum charge capacity of the assembly battery 110, etc. are considered.

The state of health of the assembly battery 110 may be acquired by the assembly battery control part 150 or acquired by another functional part and informed to the average current monitoring part 152. The assembly battery control part 150 corresponds to "state of health acquisition part" in the invention.

As below, a method of calculating SOC used as the input to the allowable current calculation part 151 will be explained.

Figure 4:
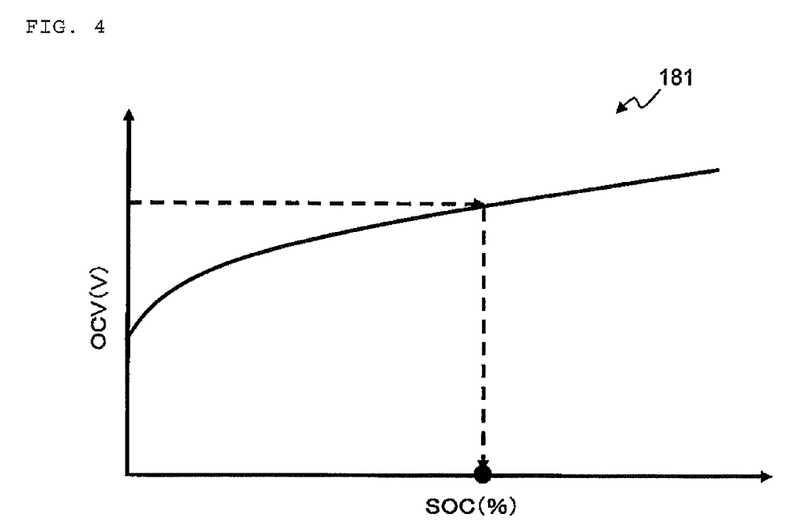
FIG. 4 shows an example of an SOC table 181 stored by a memory part 180.

FIG. 4 shows an example of the SOC table 181 stored by the memory part 180. The SOC table 181 is a data table describing a correspondence relationship between the OCV of the battery cell 111 and the SOC of the battery cell ill. Any data format may be used, and here, for convenience of explanation, the data example is shown in a graphical form. Note that, in the embodiment, the data table is used, however, the correspondence relationship between the OCV and the SOC may be represented using a numerical expression or the like. Any means that enables conversion from OCV to SOC or from SOC to OCV as characteristic information representing the correspondence relationship between the OCV and the SOC may be employed.

The OCV is a voltage of the battery cell 111 with no load. The voltage between terminals of the battery cell 111 measured at the time before the relays 300, 310, 320, 330 are closed, when the relays 300, 310, 320, 330 are closed, but charge or discharge of the assembly battery 110 is not started, or the like is determined as the OCV. Further, the voltage when the charge or discharge of the assembly battery 110 is performed, but the current value thereof is weak may be regarded as the OCV.

When the current value output from or input to the battery cell ill is large, the internal resistance contained in the battery cell 111 causes measurable voltage drop or voltage rise. The battery voltage in this regard is a closed circuit voltage (CCV), and it is difficult for the battery cell control part 121 to directly grasp the OCV of the battery cell 111 under the condition. To obtain the OCV in this case; it is necessary for the assembly battery control part 150 to calculate the OCV with the following formula 1 using the CCV of the battery cell ill measured by the battery cell control part 121, a current I output from or input to the battery cell 111 measured by the current sensing part 130, an internal resistance R of the battery cell 111 stored in advance, and information on a polarization voltage Vp. The obtained OCV is input to the table in FIG. 4, and thereby, SOC at each time is obtained.

The calculation of the following formula 1 may be executed by the assembly battery control part 150 regardless of whether or not the battery cell 111 is charged or discharged. The SOC is calculated with respect to each battery cell 111 using the OCV of each of the battery cells 111 forming the assembly battery 110 or the like.

As another method of calculating the SOC, a method of obtaining the SOC by integration of the current output from or input to the battery cell 111 is known (SOC=initial SOC+100×∫Idt/full charge capacity). In the embodiment, either SOC calculation method may be employed. If the calculation is performed with respect to each battery cell 111, the SOC with respect to each battery cell 111 may be obtained, and, if the calculation is collectively performed on the whole assembly battery 110, the average SOC of the battery cells 111 may be obtained.

To obtain the SOC with respect to each battery cell 111, when the SOC calculation method of obtaining the SOC by integration of the CCV, R, Vp of the following formula 1 and the above described current is employed, it is necessary to prepare the initial SOC, the full charge capacity, etc. with respect to each battery cell 111 as calculation parameters.

$$OCV=CCV-I\times R-Vp \quad \text{(formula 1)}$$

The assembly battery control part 150 may obtain the SOC of the battery cell 111 using the OCV of the battery cell 111 detected by the battery cell control part 121 and the SOC table 181. Further, the OCV of the assembly battery 110 may be obtained by summing up of the OCV of the battery cells 111. When the SOC characteristics vary with respect to each battery cell 111, the SOC table 181 may be provided with respect to each battery cell ill.

The allowable current calculation part 151 shown in FIG. 3 will be explained. The allowable current calculation part 151 obtains the current value that the assembly battery 110 can charge and discharge to the maximum (allowable current) using the above described SOC and temperature. The allowable charge current is smaller when the SOC is higher and the allowable charge current is larger when the SOC is lower; and the allowable discharge current is larger when the SOC is higher and the allowable discharge current is smaller when the SOC is lower. Further, the internal resistance of the battery cell ill has temperature characteristics and the internal resistance is larger as the temperature is lower, and the allowable charge and discharge current is smaller as the temperature is lower and the allowable charge and discharge current is larger as the temperature is higher.

Figure 5:
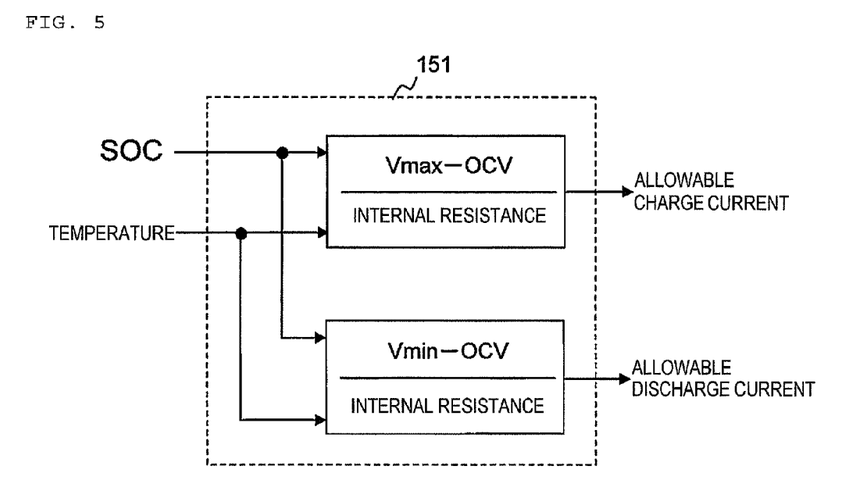
FIG. 5 shows an allowable current calculation part 151 of the assembly battery control part 150 in control blocks.
Figure 6:
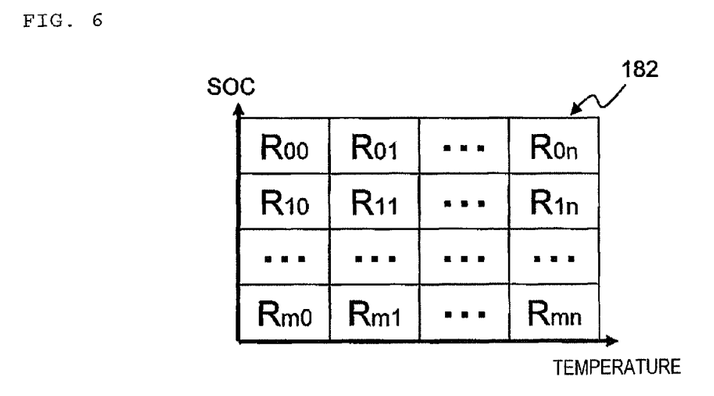
FIG. 6 shows an example of an internal resistance table 182 stored by the memory part 180.

FIG. 5 shows control blocks showing calculation contents of the allowable current calculation part 151. Supposing that the maximum terminal voltage of the battery cell 111 is Vmax, the allowable charge current may be obtained by the following formula 2. For the OCV of the formula 2, the calculation result of the formula 1 may be used, or, when the SOC is obtained by integration of the current output from or input to the battery cell 111, a conversion result of the calculation result of the SOC into the OCV using the SOC table 181 in FIG. 4 may be used. FIG. 5 shows a case where the SOC is used as input as an example. The internal resistance value of the formula 2 may be acquired from a data table describing the internal resistance values in response to the SOC and the temperatures as shown in FIG. 6. Note that the data table is used in the embodiment, however, like the SOC table 181 in FIG. 4, the correspondence relationship between the temperature and the SOC and the internal resistance may be represented by other means including a numerical expression than the data table, and any characteristic information of the internal resistance in response to the temperature and the SOC may be employed. When the allowable discharge current is obtained, the minimum terminal voltage Vmin may be used as expressed in the following formula 3. When the internal resistance values are largely different between charge and discharge, different internal resistance values are used for the allowable charge current and the allowable discharge current, and thereby, the charge and discharge control of the assembly battery 110 may be performed based on the more reliable allowable charge and discharge currents.

$$\text{allowable charge current}=(V\text{max}-OCV)/\text{internal resistance value} \quad \text{(formula 2)}$$

$$\text{allowable discharge current}=(V\text{min}-OCV)/\text{internal resistance value} \quad \text{(formula 3)}$$

If the assembly battery 110 is charged within the range of the allowable charge current and the assembly battery 110 is discharged within the range of the allowable discharge current, the assembly battery 110 may be charged and discharged without departing from Vmax and Vmin. Note that the allowable currents are only for the battery voltage to fall within the range from Vmax to Vmin, and heat generation etc. with charge and discharge are not considered at all. It is possible that the deterioration progresses more quickly with the rise of the temperature of the battery cells 111, and management in consideration of heat generation may be necessary with respect to the other components than the battery cells 111 forming the battery system 100. That is, to optimally use the battery system 100, it is necessary to newly add a function of considering the heat generation to the allowable current calculation part 151, and the average current monitoring part 152 shown in FIG. 3 is provided in the embodiment.

Figure 7:
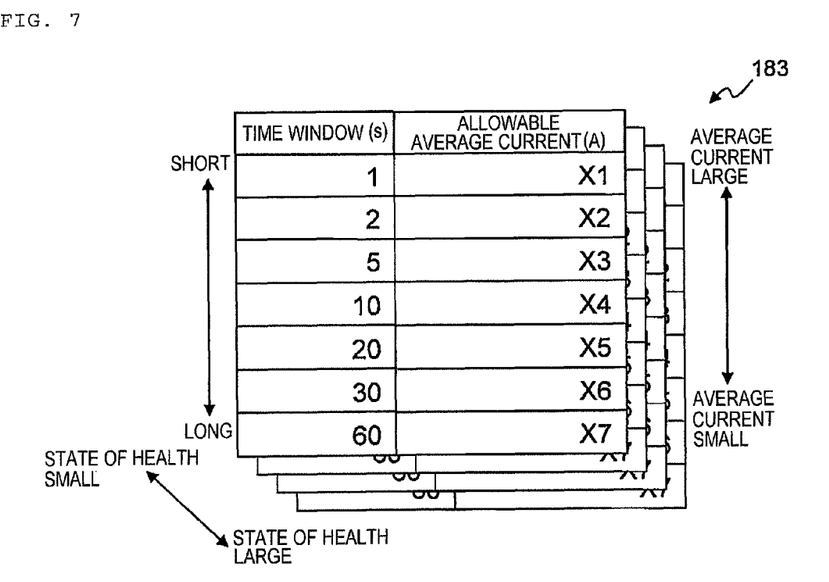
FIG. 7 shows a configuration of an allowable average current table 183 stored by the memory part 180.

The detailed processing contents of the average current monitoring part 152 will be explained as below. FIG. 7 shows a configuration and a data example of an allowable average current table 183 used by the average current monitoring part 152 and stored in the memory part 180. The allowable average current table 183 is a data table describing allowed average currents for the respective time windows, and also describing short-time rated currents for the respective components forming the battery system 100. There are features in response to the components such that the short-time rated currents are described with respect to the shorter time window widths than those of the other components and the allowed average current values are larger than those of the other components. These are collected with respect to the time windows and the allowed average currents, and thereby, the data table in FIG. 7 is obtained. Note that the allowable average currents are not necessarily described with respect to all components, and, for example, only the allowable average currents of the components with the higher necessity of performing current limitation may be described or the allowable average currents may be described with respect to each component unit grouped to some degree. Furthermore, the information of the allowable average currents may be stored in the memory part 180 using, not the data table, but other means including numerical expressions expressing the allowable average currents in response to the time windows.

The allowable average current table 183 further describes the allowed average current for the respective time windows with respect to each state of health (SOH) of the assembly battery 110. Therefore, the allowable average current table 183 describes the allowable average currents for the respective time windows and the respective states of health. The average current monitoring part 152 acquires the allowable average current corresponding to the current state of health of the assembly battery 110 from the allowable average current table 183, and uses it as the current limit value.

Generally, the charge and discharge performance is lower with the deterioration of the battery, and the allowable average current takes the smaller value as the state of health of the assembly battery 110 progresses. Note that it is not necessary to set the allowable average current to be smaller in all of the time windows. There are a plurality of other components forming the battery than the battery main body and some allowable average currents corresponding to those components may not be affected even when the battery is deteriorated, and thus, the same allowable average current may be used even when the deterioration of the battery progresses. In other words, the allowable average current under the deteriorated condition takes the smaller value than that of the allowable average current under the undeteriorated condition in at least one time window, however, the smaller allowable average currents are not necessarily set in all of the time windows.

FIG. 7 shows the example describing the allowable average currents for the respective states of health (SOH) of the assembly battery 110, however, instead, only the allowable average currents under the undeteriorated condition of the assembly battery 110 may be described and, regarding the allowable average currents under the deteriorated condition of the assembly battery 110, the average current monitoring part 152 may obtain the values reduced in response to the states of health of the assembly battery 110 by calculation. The time windows for which the allowable average currents are reduced and the reduction widths may be set in advance.

<Embodiment 1: Idea of System Operation>

Figure 8:
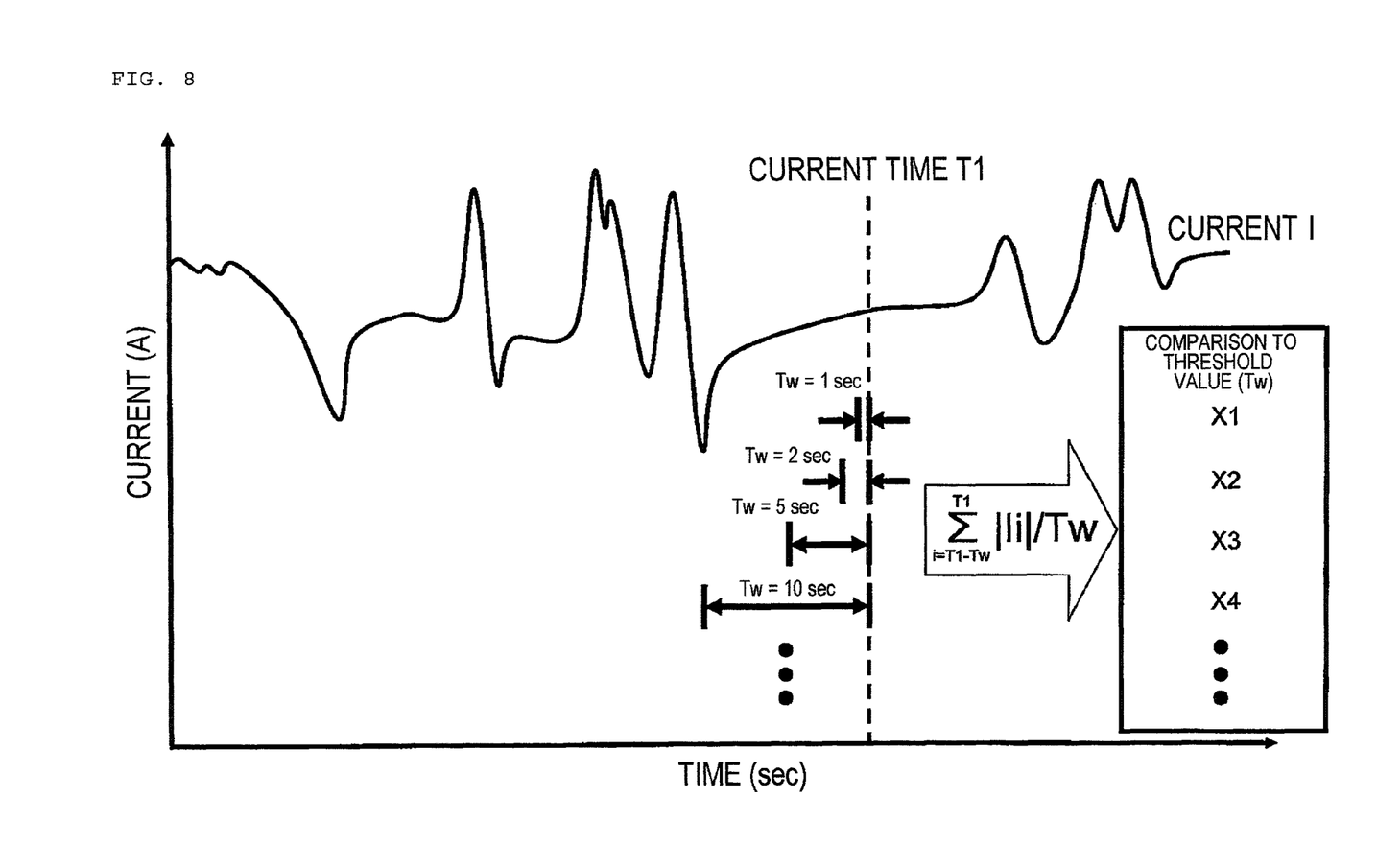
FIG. 8 is a conceptual diagram of calculation of an average current with respect to each window width by the assembly battery control part 150.

FIG. 8 shows processing contents performed by the average current monitoring part 152 of the assembly battery control part 150. The average current monitoring part 152 determines whether or not to limit the current at time T1 according to whether or not the average value of the absolute values of the currents output from and input to the assembly battery 110, obtained by tracking back from the time T1 by the time window width exceeds the allowable average current designated in the allowable average current table 183:

The average current monitoring part 152 obtains the average value of the absolute values of the currents output from and input to the assembly battery 110 in each time window width seen from the time T1, and compares the value with the allowable average currents corresponding to each time window width described in the allowable average current table 183. If the average current in one of the time window widths exceeds the corresponding allowable average current within the allowable average current table 183, the part performs limitation so that the average current in the time window width may be below the allowable average current. If the average currents exceed the allowable average currents in the time window widths, the minimum allowable average current is set to be the current limit value, and thereby, the currents are preferentially limited.

Figure 9:
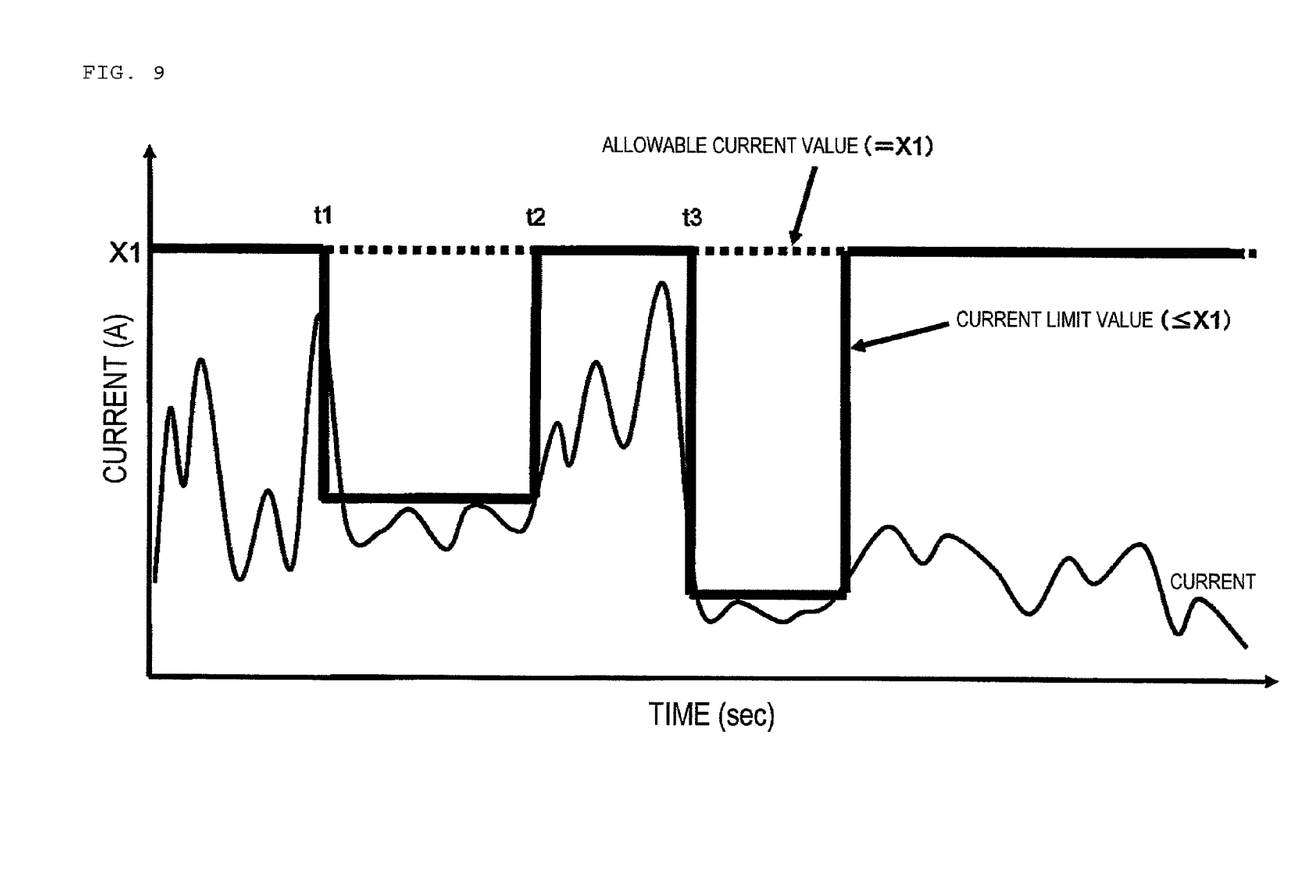
FIG. 9 shows processing of limiting a battery current by the assembly battery control part 150.

FIG. 9 shows a state in which the average current monitoring part 152 of the assembly battery control part 150 limits the currents. As below, the operations at the respective times will be explained. Note that the result of the allowable current calculated by the allowable current calculation part 151 here is set to X1 as the upper limit value for the assembly battery 110. The initial value of the current limit value by the average current monitoring part 152 is also set to X1 as the allowable average current corresponding to the shortest time window.

At time t1, assume that the average value of the absolute values of the currents output from and input to the assembly battery 110 in a certain time window width exceeds the allowable average current corresponding to the time window width. The average current monitoring part 152 executes limitation of setting the exceeding allowable average current to the current limit value so that the average current may be equal to or less than the allowable average current. For example, supposing that the allowable average current of a certain window width is 10 A, if the average current of the same window width exceeds 10 A, the excess over the allowable average current is determined and 10 A as the allowable average current is employed as the current limit value. When the allowable average current of a certain window width is 100 A, if the average current of the same window width exceeds 100 A, 100 A is similarly employed as the current limit value. As shown in FIG. 3, the final value of the allowable current output by the assembly battery control part 150 is set to the smaller value of the output of the allowable current calculation part 151 and the output of the average current monitoring part 152, and, if the current limit value output by the average current monitoring part 152 is below the allowable current value output by the allowable current calculation part 151, the above described current limit value is output as the final allowable current of the assembly battery control part 150 and charge and discharge control of the assembly battery 110 is performed based thereon.

Figure 10:
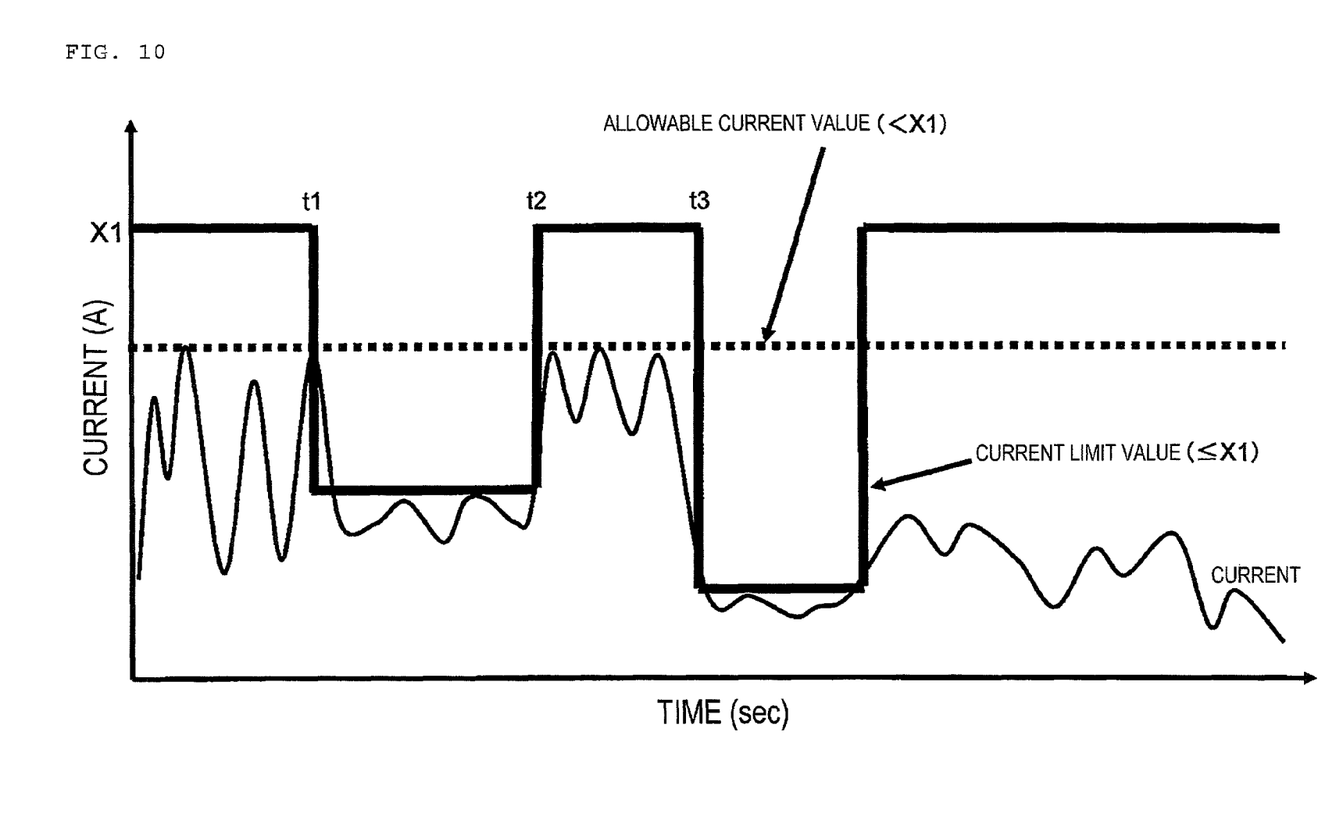
FIG. 10 shows processing of limiting the battery current by the assembly battery control part 150.

At time t2, assume that the average currents in all time window widths are equal to or less than the allowable average current. The average current monitoring part 152 determines that application of limitation is not necessary, and returns the current limit value to the initial value (X1 corresponding to the shortest time window) and outputs X1 as the allowable current. Note that, as shown in FIG. 10, under the condition that the ambient temperature of the battery system 100 is lower, the internal resistance of the battery cell 111 is larger and the output of the allowable current calculation part 151 is smaller. For the output of the allowable current of the assembly battery control part 150 under the condition, the result of the allowable current calculation part 151 is employed until time t1, the current limit value of the average current monitoring part 152 is employed from t1 to t2, and the output of the allowable current calculation part 151 is employed again from t2 to t3. The assembly battery control part 150 subsequently performs the same operation.

<Embodiment 1: Operation Procedure of System>

As below, an operation procedure for allowing the current flowing in the assembly battery 110 to fall within the allowable average current by the battery system 100 will be explained.

(Step 1: Acquire Average Currents for the Respective Time Window Widths)

The assembly battery control part 150 acquires the current flowing in the assembly battery 110 from the current sensing part 130, and obtains the average current with respect to each time window width using the method explained in FIG. 8. Specifically, the time windows of 1 second, two seconds, five seconds, . . . , sixty seconds shown in FIG. 7 are set and the average value of the absolute values of the charge and discharge currents of the assembly battery 110 within the period tracking back from the current time by the time window width. The time history of the current flowing in the assembly battery 110 may be stored and saved in the memory part 180, for example.

(Step 2: Acquire the Allowable Average Currents)

The assembly battery control part 150 reads the allowable average current table 183 using the average current monitoring part 152 and acquires the allowable average currents for the respective time window widths.

(Step 3: Limit the Current Flowing in the Assembly Battery 110)

The assembly battery control part 150 compares the average value of the absolute values of the currents output from and input to the assembly battery 110 with respect to each time window width obtained at step 1 and the allowable average current in each time window width acquired at step 2, and confirms whether or not the average current exceeds the allowable average current with respect to each time window width. If there is an excess over the allowable average current in one of the time window widths, the average current monitoring part 152 employs the excessive allowable average current as the current limit value. The explanation will be made more specifically using FIG. 11. In this case, an average current Iave obtained in the time window of two seconds exceeds X2 as an allowable average current corresponding thereto at time t1, and the average current monitoring part 152 changes the current limit value to X2. If the average current obtained in the time window of five seconds exceeds an allowable average current X3 corresponding thereto, the current limit value of the average current monitoring part 152 is set to X3, and, if the average current obtained in the time window of sixty seconds exceeds an allowable average current X7, X7 is employed as the current limit value. The assembly battery control part 150 compares the current limit value set by the average current monitoring part 152 and the output of the allowable current calculation part 151 and employs the smaller one, and, if the current limit value of the average current monitoring part 152 is smaller, the final allowable current value of the assembly battery control part 150 is employed and the charge and discharge current is limited. The step corresponds to times t1 and t3 in FIG. 9.

(Step 3: Limit Currents Flowing in the Assembly Battery 110: Supplement)

At the step, the average current monitoring part 152 acquires the SOH of the assembly battery 110 in parallel to the above described processing. If the progress of the deterioration of the assembly battery 110 is recognized, the allowable average current when the state of health is larger is read out from the allowable average current table 183 and used in the above described processing. It may be determined that the allowable average current should be switched at what time point of the progress of the deterioration of the assembly battery 110 using an appropriate threshold value, for example. This also applies to a case where the allowable average current is obtained by calculation instead of providing a table with respect to each state of health of the assembly battery 110.

(Step 4: Restore the Current Limitation Flowing in the Assembly Battery 110)

The assembly battery control part 150 restores the current limit value of the average current monitoring part 152 to the value before limitation at step 3 at the time when the average currents in all time window widths fall within the allowable average current. The step corresponds to time t2 in FIG. 9.

(Step 5: Repeat the Above Described Processing)

The assembly battery control part 150 repeatedly executes the processing at the above described step 1 to step 4 while the battery system 100 is operated. Thereby, the average currents in the respective time window widths of the assembly battery 110 may be allowed to fall within the range of the allowable average current.

<Embodiment 1: Summary>

As described above, the battery system 100 according to the embodiment 1 includes the allowable average current table 183 describing the allowable average currents for the respective time window widths and controls the battery current according to the description so that the average value of the absolute values of the currents output from and input to the assembly battery 110 with respect to each time window width may fall within the allowable average current with respect to each time window width. Thereby, the battery current may be controlled in consideration of the battery cells 111 of the battery system 100 and the short-time rated currents for the respective components forming the assembly battery 110.

Further, the battery system 100 according to the embodiment 1 controls the battery current using the allowable average current reduced in response to the state of health of the assembly battery 110. Thereby, the battery current may be optimized according to the state of health of the assembly battery 110, and the battery performance may be sufficiently exhibited.

<Embodiment 2>

In embodiment 1, as the methods of obtaining the state of health of the assembly battery 110, the two methods of (a) obtaining the state of health of the assembly battery 110 using rise of the internal resistance of the battery cell 111 when the battery cell 111 is deteriorated and (b) obtaining the state of health of the assembly battery 110 by sensing decrease in the maximum charge capacity of the assembly battery 110 are exemplified. It is considered that the appropriate method used for obtainment of the state of health of the assembly battery differs depending on the specifications of the assembly battery 110.

For example, since a relatively long mileage is required for an electric car, a method of suppressing reduction in mileage by limiting the output when the decrease of the maximum charge capacity of the secondary battery progresses is considered for the electric car. On the other hand, since magnitude of instantaneous output affects the fuel consumption in a hybrid electric car, a case of designing for limiting the output when the rise of the internal resistance of the secondary battery progresses is considered for the hybrid electric car.

Further, it is desirable that the secondary battery for PHEV exemplified in embodiment 1 has both features for electric car and features for hybrid electric car. That is, it is desirable that the battery system 100 for PHEV is adapted to switch between an operation mode of providing electric power to the electric car and an operation mode of providing electric power to the hybrid electric car. Accordingly, in the embodiment 2, the assembly battery control part 150 has an operation mode of providing electric power to the electric car (EV mode) and an operation mode of providing electric power to the hybrid electric car (HEV mode).

The average current monitoring part 152 monitors the maximum charge capacity of the assembly battery 110 when the assembly battery control part 150 operates in the EV mode, and, when the capacity decreases, the monitoring part determines that the assembly battery 110 is deteriorated in response to the degree of decrease. Further, since it is not very necessary to monitor the maximum charge capacity of the assembly battery 110 when the assembly battery control part 150 operates in the HEV mode, the monitoring part determines the state of health of the assembly battery 110 using another criterion. Specifically, the part monitors the internal resistance of the battery cell ill, and, when the resistance increases, determines that the assembly battery 110 is deteriorated in response to the degree of increase.

<Embodiment 2: Summary>

As described above, the battery system 100 according to the embodiment 2 is adapted to switch between the EV mode and the HEV mode, and obtains the state of health of the assembly battery 110 in response to the degree of decrease of the maximum charge capacity of the assembly battery 110 when the system operates in the EV mode and limits the battery current using the allowable average current corresponding to the state of health. Thereby, the optimum performance for the PHEV traveling in the EV mode may be provided.

Further, the battery system 100 according to the embodiment 2 determines the state of health of the assembly battery 110 in response to the degree of rise of the internal resistance of the battery cell 111 and limits the battery current using the allowable average current corresponding to the state of health. Thereby, the optimum performance for the PHEV traveling in the HEV mode may be provided.

<Embodiment 3>

Figure 11:
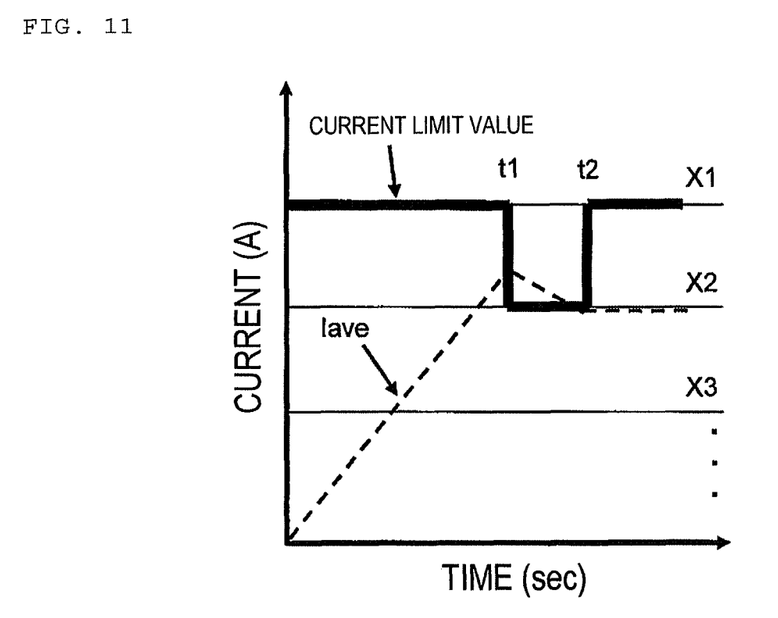
FIG. 11 shows a process of changing a limit current by the assembly battery control part 150.

In embodiments 1 to 2, the explanation that the average current with respect to each time window width is allowed to fall within the allowable range is made. As the specific method, the average currents Iave are calculated in the respective window widths, compared to the allowable average currents corresponding to the respective window widths, and, when the obtained average current Iave exceeds the allowable average current, control of setting the current limit value to the allowable average current is performed (FIG. 11). Here, when the excess of the average current Iave over the limit value is sensed, the current limit value is determined in consideration of the amount of excessive current, and thereby, more optimum limitation processing may be realized.

Accordingly, in embodiment 3 of the invention, the assembly battery control part 150 of, when the average current Iave exceeds the allowable average current, setting the current limit value in consideration of the excessive amount is proposed. The configuration of the battery system 100 is generally the same as that of embodiments 1 to 2, and the difference will be centered for explanation as below.

Figure 12:
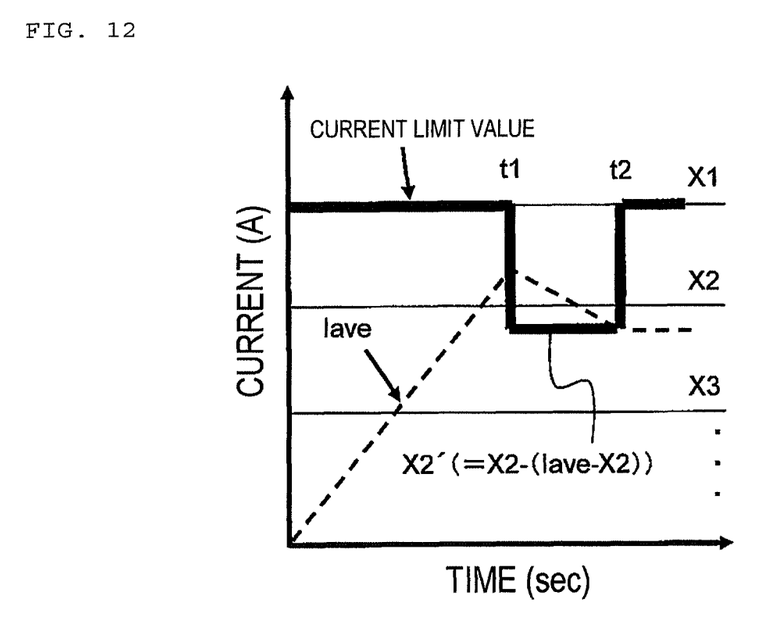
FIG. 12 shows a process of changing the limit current by the assembly battery control part 150.

FIG. 12 shows a process of changing the current limit value of the battery current by the assembly battery control part 150. In FIG. 11 of embodiment 1, the explanation that the average current monitoring part 152 obtains the average current Iave in the time window of two seconds, for example, and, when the current exceeds the allowable average current X2, the current limit value is switched from X1 to X2 is made. In the method, it is impossible to reflect the excessive amount of the average current Iave over the allowable average current X2 on the current limit value and reliably limit the battery current. Accordingly, in the embodiment 3, when the current exceeds the allowable average current X2, the current limit value is switched from X1 to X2 and the current limit value is changed by the excessive amount.

The average current monitoring part 152 of the assembly battery control part 150 obtains the average value of the absolute values of the currents output from and input to the assembly battery 110 with respect to each time window width, and, as shown in FIG. 12, for example, if the excess of the average current Iave obtained in the time window of two seconds at time t1 over the allowable average current X2 for the time window of two seconds is sensed, the current limit value reflecting the excessive amount of the average current over the allowable average current is obtained as expressed by the formula 4. The current values output from and input to the battery are limited using the current limit value reflecting the excessive amount of Iave over the allowable, average current, and thereby, optimum charge and discharge control of the assembly battery 110 is performed.

$$X2'=X2-(Iave-X2) \quad \text{(formula 4)}$$

<Embodiment 3: Summary>

As described above, if the average current with respect to each time window width exceeds the allowable average current described in the allowable average current table 183, the battery system 100 according to the embodiment 3 sets the current limit value from which the excessive amount over the allowable average current has been subtracted. Thereby, the average current may be allowed to fall within the allowable average current and charge and discharge control of the assembly battery 110 in consideration of the excessive current may be realized.

<Embodiment 4>

In the embodiment, a change is made to the average current monitoring part 152 of the assembly battery control part 150. In embodiments 1 to 2, the average value of the absolute values of the currents output from and input to the assembly battery 110 with respect to each window width is obtained and, if the average value exceeds the allowable average current, the allowable average current is set as the current limit value. Here, as shown in FIG. 11, when the allowable average current X1 for the window time of one second is used as the initial value of the current limit value and the average current obtained in the window time of two seconds exceeds the allowable average current X2 corresponding to the window time of two seconds, the current limit value is changed from the initial value X1 to X2, and the currents output from and input to the assembly battery 110 may be decreased. However, if the average current exceeding the allowable average current X1 for the window time of one second is obtained, the current limit value is changed from the initial value X1 to X1 as the allowable average current. That is, the current limit value is not changed as a result, and it is impossible to limit the charge and discharge current of the assembly battery 110 to be smaller.

Accordingly, in the embodiment, if the average current exceeding the allowable average current X1 for the window time of one second is obtained, the processing described in embodiment 3 is performed and the current limit value is determined in consideration of the excessive amount over the allowable average current.

Specifically, as expressed by the formula 4, if the average current exceeding the allowable average current X1 for the window time of one second is sensed, a result of decreasing X1 by the excessive amount of the average current over the allowable average current X1 is set as the current limit value. Thereby, if the average current exceeds the allowable average current X1, the situation that the initial current limit value X1 is changed to X1, i.e., the current limit value is virtually unchanged may be avoided.

Note that the processing of setting the current limit value from which the excessive amount over the allowable average current has been subtracted when the average current equal to or more than the allowable average current described in embodiment 3 is sensed may be not only on the allowable average current X1, but extended to X2 and X3 and the application range may be expanded. When the average current over the allowable average current less than a threshold value is sensed, the processing described in embodiment 1 (setting the current limit value to the allowable average current) may be performed, and, when the average current over the allowable average current equal to or more than the threshold value is sensed, the processing described in embodiment 3 (setting the current limit value by reflecting the excessive amount over the allowable average current) may be performed.

In the embodiment, the battery system 100 that may change the method of setting the current limit value in response to the allowable average current and limiting the currents output from and input to the assembly battery 110 to be smaller may be provided.

<Embodiment 5>

Figure 13:
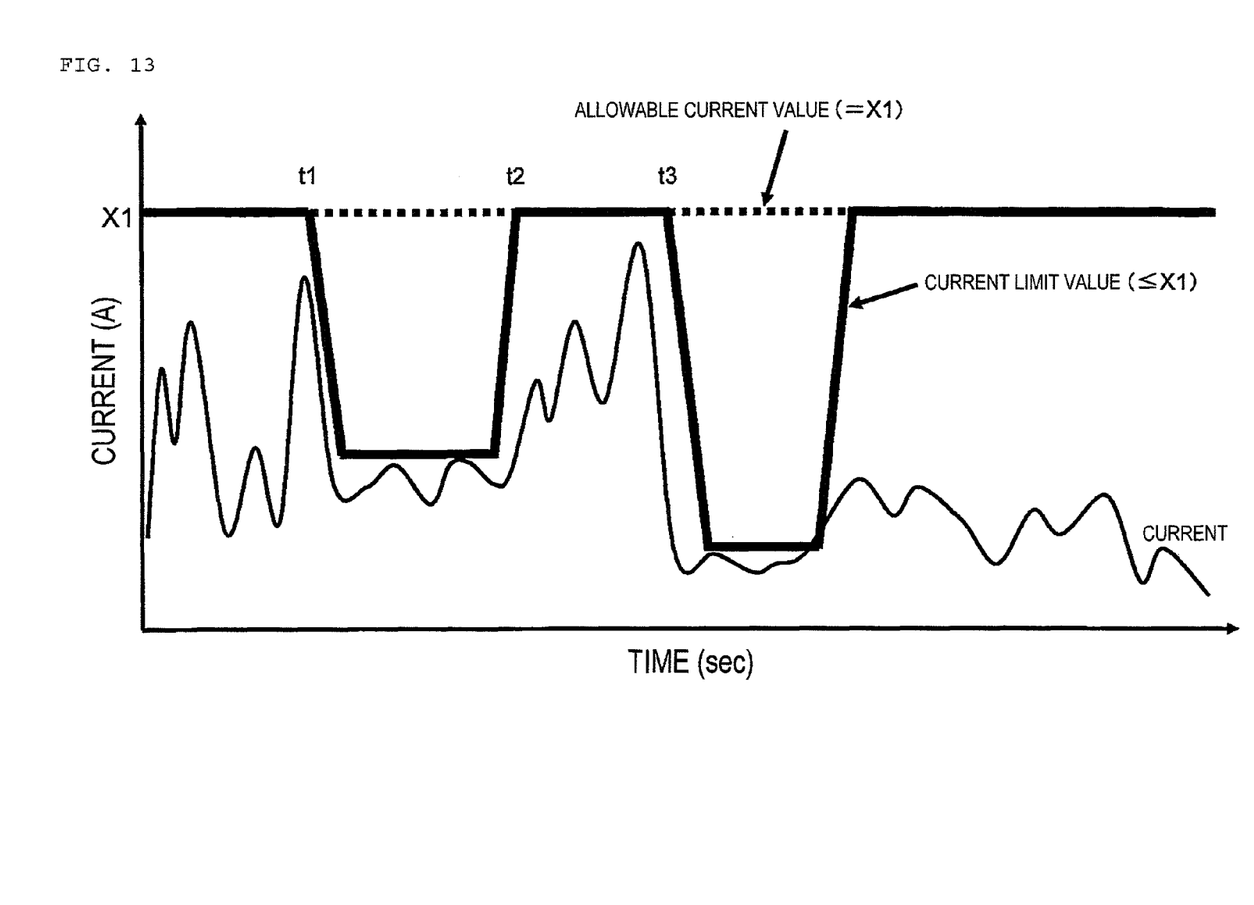
FIG. 13 shows processing of limiting the battery current by the assembly battery control part 150.

FIG. 13 shows a state in which the average current monitoring part 152 of the assembly battery control part 150 limits the battery current. In FIG. 9 of embodiment 1, instantaneous switching of the current limit value to set by the average current monitoring part 152 is described, however, as shown in FIG. 13, the current limit value may be gradually changed by setting a gradient to some degree. Further, gradients may be set for both switching of the current limit value to the lower value and the upper value, the degree of gradient may be changed for switching to the lower value and switching to the upper value, or a gradient may be set for either one.

Thus far, the invention achieved by the inventors has been specifically explained based on the embodiments, however, the invention is not limited to the embodiments, but; obviously, various changes may be made without departing from the scope thereof.

Further, regarding the above described respective configurations, functions, processing parts, all or part of them may be realized as hardware by design using an integrated circuit, for example, or may be realized as software by a processor to execute programs for realizing the respective functions. The information including the programs, tables, etc. for realizing the respective functions may be stored in storage devices such as a memory or a hard disc and a storage medium such as an IC card or a DVD.

REFERENCE SIGNS LIST

100: battery system, 110: assembly battery, 111: battery cell, 112: battery cell group, 120: battery cell management part, 121: battery cell control part, 122: voltage detection circuit, 123: control circuit, 124: signal input/output circuit, 125: temperature sensing part, 130: current sensing part, 140: voltage sensing part, 150: assembly battery control part, 160: signal communication means, 170: insulation element, 180: memory part, 181: SOC table, 182: internal resistance table, 200: vehicle control part, 300-330: relays, 400: inverter, 410: motor generator, 420: charger.

The invention claimed is:

1. A battery controller comprising:
   a control part that controls an assembly battery in which a plurality of battery cells are connected;
   a current measurement part that measures currents flowing in the battery cells or the assembly battery;
   a state of health acquisition part that acquires a state of health of the assembly battery; and
   a memory that stores allowable average current characteristic information representing upper limits of average values of absolute values of the currents in a plurality of different time windows and upper limit values of the currents,
   wherein the control part controls the currents so that the average value of the absolute values of the currents obtained with respect to each time window fall within the upper limit of the average value with respect to each time window represented in the allowable average current characteristic information,
   if the state of health acquisition part senses deterioration of the assembly battery, the control part controls the currents so that, in at least one of the time windows, the average value of the absolute values of the currents in the time window width may fall within a value obtained by subtraction of the upper limit in response to the state of health of the assembly battery, and
   if the current exceeds the upper limit stored in the memory, the control part changes the upper limit value stored in the memory to be smaller by the excessive amount and controls the current according to the changed upper limit value.

2. The battery controller according to claim 1, wherein the state of health acquisition part senses the state of health of the assembly battery by sensing a rise of an internal resistance of the battery cells, and
   the control part subtracts the upper limit of the average value in response to the degree of rise of the internal resistance of the battery cells in at least one of the time windows.

3. The battery controller according to claim 1, wherein the state of health acquisition part senses the state of health of the assembly battery by sensing decrease of the maximum charge capacity of the assembly battery, and
   the control part subtracts the upper limit of the average value in response to the degree of decrease of the maximum charge capacity of the assembly battery in at least one of the time windows.

4. The battery controller according to claim 2, wherein the control part operates an operation mode of the assembly battery to switch between an operation mode of supplying electric power to an electric car and an operation mode of supplying electric power to a hybrid electric car, and
   when the assembly battery is operated in the operation mode of supplying electric power to the hybrid electric car, the control part subtracts the upper limit of the average value in response to the degree of rise of the internal resistance of the battery cells in at least one of the time windows.

5. The battery controller according to claim 3, wherein the control part operates an operation mode of the assembly battery to switch between an operation mode of supplying electric power to an electric car and an operation mode of supplying electric power to a hybrid electric car, and
   when the assembly battery is operated in the operation mode of supplying electric power to the electric car, the control part subtracts the upper limit of the average value in response to the degree of decrease of the maximum charge capacity of the assembly battery in at least one of the time windows.

6. The battery controller according to claim 1, wherein the memory stores the allowable average current characteristic information for the respective states of health of the assembly battery,
   the allowable average current characteristic information describes a value obtained by subtraction of the upper limit in response to the state of health of the assembly battery in at least one of the time windows, and
   when the state of health acquisition part senses deterioration of the assembly battery, the control part controls the current using the upper limit described by the allowable average current characteristic information corresponding to the state of health of the assembly battery.

7. The battery controller according to claim 1, wherein, when the state of health acquisition part senses deterioration of the assembly battery, the control part calculates a value obtained by subtraction of the upper limit in response to the state of health of the assembly battery in at least one of the time windows and controls the currents so that the average value of the absolute values of the currents in the time window width may fall within the upper limit after the subtraction.

8. The battery controller according to claim 1, wherein the control part respectively compares the average values of the absolute values of the currents obtained for the respective time windows and the average values for the respective time windows represented by the allowable average current characteristic information, and, if a value corresponding to one of the time windows is excessive, the control part controls the currents so that the value corresponding to the excessive time window of the average values for the respective time windows represented by the allowable average current characteristic information may be the maximum value of the currents.

9. The battery controller according to claim 1, wherein the control part respectively compares the average values of the absolute values of the currents obtained for the respective time windows and the average values for the respective time windows represented by the allowable average current characteristic information, and, if a value corresponding to one of the time windows is excessive, the control part controls the currents so that a value obtained by subtraction of the excessive amount from the value corresponding to the excessive time window of the average values for the respective time windows represented by the allowable average current characteristic information may be the maximum value of the currents.

10. The battery controller according to claim 1, wherein the control part respectively compares the average values of the absolute values of the currents obtained for the respective time windows and the average values for the respective time windows represented by the allowable average current characteristic information, and, if a value corresponding to one of the time windows is excessive, the control part determines whether or not the average value of the absolute values of the currents is equal to or more than a predetermined average value represented by the allowable average current characteristic information, when the average value of the absolute values of the currents is less than the predetermined average value, the control part controls the currents so that a value corresponding to the excessive time window of the average values for the respective time windows represented by the allowable average current characteristic information may be the maximum value of the currents, and when the average value of the absolute values of the currents is equal to or more than the predetermined average value, the control part controls the currents so that a value obtained by subtraction of the excessive amount from the value corresponding to the excessive time window width of the average values for the respective time window represented by the allowable average current characteristic information may be the maximum value of the currents.

11. The battery controller according to claim 10, wherein the allowable average current characteristic information describes the maximum average value as a value corresponding to a shortest time window.

12. The battery controller according to claim 10, wherein the allowable average current characteristic information describes a short-time rated current value in one or more components forming the battery controller.

13. The battery controller according to claim 1, wherein the allowable average current characteristic information describes a short-time rated current value in one or more components forming the battery controller.

14. The battery controller according to claim 1, comprising a voltage measurement part that measures a voltage between terminals of the battery cell and the assembly battery, wherein the control part calculates an allowable current of the battery cell at least based on measurement information of the voltage measurement part and the current measurement part, and controls the currents so that the currents flowing in the battery cell or the assembly battery is equal to or less than the smaller one of the current obtained from the allowable average current characteristic information and the allowable current.

15. The battery controller according to claim 1, wherein the memory part stores SOC characteristic information describing a correspondence relationship between an open circuit voltage of the battery cell and a charge state, and the control part constantly acquires a current charge state of the battery cell or the assembly battery using the measured or estimated open circuit voltage of the battery cell or the assembly battery and the SOC characteristic information or constantly acquires the current charge state of the battery cell or the assembly battery by integration of the currents flowing in the assembly battery measured by the current measurement part, and calculates an allowable current of the assembly battery using the value.

16. A battery system comprising:
the battery controller according to claim 1; and
an assembly battery in which a plurality of battery cells are connected,
wherein the battery controller controls the battery cells or the assembly battery.

* * * * *